United States Patent
Azarko

(10) Patent No.: US 10,365,753 B2
(45) Date of Patent: Jul. 30, 2019

(54) HANDS-FREE POWER LIFTGATE OPENER

(71) Applicant: VAIS Technology LTD, Engewood, CO (US)

(72) Inventor: Vladimir Azarko, Castle Rock, CO (US)

(73) Assignee: VAIS TECHNOLOGY LTD., Englewood, CO (US)

( * ) Notice: Subject to any disclaimer, the term of this patent is extended or adjusted under 35 U.S.C. 154(b) by 0 days.

(21) Appl. No.: 15/272,782

(22) Filed: Sep. 22, 2016

(65) Prior Publication Data

US 2017/0080785 A1    Mar. 23, 2017

Related U.S. Application Data

(60) Provisional application No. 62/222,546, filed on Sep. 23, 2015.

(51) Int. Cl.
| | |
|---|---|
| *B60J 5/10* | (2006.01) |
| *G06F 3/041* | (2006.01) |
| *B60R 13/10* | (2006.01) |

(52) U.S. Cl.
CPC ............ *G06F 3/0416* (2013.01); *B60J 5/101* (2013.01); *B60R 13/105* (2013.01)

(58) Field of Classification Search
CPC combination set(s) only.
See application file for complete search history.

(56) References Cited

U.S. PATENT DOCUMENTS

| | | | |
|---|---|---|---|
| 5,166,679 A | 11/1992 | Vranish et al. | |
| 8,091,280 B2 | 1/2012 | Hanzel et al. | |
| 9,388,623 B2 * | 7/2016 | Ette | B60R 25/245 |
| 9,845,632 B2 * | 12/2017 | Dezorzi | E05F 15/76 |
| 2008/0129446 A1 * | 6/2008 | Vader | B60R 25/24 340/5.6 |
| 2013/0112823 A1 * | 5/2013 | Kreft | B60R 13/105 248/205.3 |
| 2013/0249669 A1 | 9/2013 | Zwiener | |
| 2014/0195073 A1 * | 7/2014 | Herthan | B60R 25/2045 701/2 |
| 2014/0373447 A1 * | 12/2014 | Gunreben | G07C 9/00309 49/31 |
| 2015/0116085 A1 | 4/2015 | Juzswik | |
| 2017/0044816 A1 * | 2/2017 | Salter | E05F 15/73 |
| 2017/0284149 A1 * | 10/2017 | Pirchheim | E05F 15/73 |

* cited by examiner

*Primary Examiner* — Adam D Tissot
*Assistant Examiner* — Edward J Pipala
(74) *Attorney, Agent, or Firm* — Kyle W. Rost

(57) ABSTRACT

A hands-free opener for a power liftgate provides a proximity sensor that fits into an operating position behind the vehicle license plate or in the license plate area. A driven shield located behind the sensor shapes the electric field from the sensor to achieve directional detection extending outward from the front side of the sensor. A proximate ground plane at a preselected spacing from the back side of the ground plane reduces interference.

15 Claims, 11 Drawing Sheets

HANDS-FREE POWER LIFTGATE OPENER

BACKGROUND OF THE INVENTION

Field of the Invention

The invention generally relates to electrical communications and to selective electrical communication. More specifically, the invention relates to intelligence comparison for controlling electrical communication and to authorization control, regarding entry into an area, where an access barrier exists. The access barrier can be a vehicle door, which in addition to the conventional doors of a car, may refer to a trunk lid, tailgate, liftgate, or fifth door. The authorization control may relate to coded record input, such as an IC card or key, and to a wireless transceiver. The invention is the accessible placement of a device providing authorization control, with integration into a vehicle feature at such accessible location that is otherwise purposed, to establish significantly improved access to the authorization control device. Further, the invention is the adaptation of an otherwise purposed vehicle feature to additionally serve as an authorization control device so as to bring access to such authorization control device to the user without requiring special dexterity of the user to interact with the device.

INCORPORATION BY REFERENCE

This disclosure incorporates by reference the contents of U.S. Pat. No. 5,166,679 to Vranish et al, for "Driven Shielding Capacitive Proximity Sensor," issued Nov. 24, 1992, originally U.S. application Ser. No. 07/710,845 filed Nov. 24, 1992, for its teachings of driven shield technology.

DESCRIPTION OF RELATED ART

Various techniques allow keyless entry into a vehicle. A basic system provides a key fob to the user, and a manual action such as a button press on the key fob transmits a signal to the vehicle, causing a door or liftgate to unlock or physically move to an opened position. Another system that is referred to as hands-free is more sophisticated and operates on a two part basis, detecting both presence and response. Presence detection is the sensing an approach, often employing a radio frequency emitter such as a smart key or go key, into near proximity to the vehicle. The proximity detection does not require a manual button press. This technique has been applied to a vehicle liftgate as the first step of permitting hands-free entry, which can be especially useful when the user's hands are occupied with a load to be placed in the vehicle. However, proximity by itself is not a generally suitable sole criterion for automatically opening a liftgate, because the need to load the vehicle can be infrequent.

The second step in causing a liftgate to open is response. The user can be required to employ a detectable response in order to control the lifting of a liftgate, and the vehicle can be equipped with a suitable response detector that opens the liftgate when both presence and response have been detected. One known response is for the user to raise his foot in a kick action under the rear of the vehicle, where a proximity sensor on the vehicle senses the kick and then triggers the liftgate to open. U.S. Pat. No. 8,091,280 to Hanzel et al describes various types of response detectors, including audio, optical, touch, ultra sonic, and laser.

The response of kicking below the rear of a car is used commercially. At least one brand of vehicle employs the kick response to signal the vehicle to open a liftgate. This response is accompanied by practical problems. One such problem is that a user with loaded arms may find difficulty in also standing on one foot to perform the kick motion. Another problem is that every user may execute the kick differently, such that the detection system may misinterpret some user's action. Still another problem is that the sensor, being located under the car, might malfunction when covered by normal road and weather contaminants such as snow, rain water, and mud.

At least one major automaker has chosen the kick motion as the necessary response, but the automobile industry has considered other types of responses, as well. United States Patent Application Publication 2013/0249669 to Zwiener proposes that a presence detection step can involve recognition of the user by means of facial features or voice recognition. A user can cause a liftgate to open by performing any prearranged response, such as by stamping his foot or walking to a particular location. While these forms of recognition and response are technologically advanced, there is no assurance that they are reliable or desirable. For example, they present a clear problem if they deny functionality to a guest passenger whose face is not yet entered into the recognition system. Another problem might arise in a noisy area where voice recognition is difficult, or the user's action of going to a certain location might be misinterpreted.

United States Patent Application Publication 2015/0116085 to Juzswik proposes an even more automated system for opening a door or liftgate. A key fob or go key system communicates over a radio frequency with the vehicle to show that an authorized person is in the vicinity of the vehicle. Then, the vehicle allows a predetermined time interval to pass, after which the vehicle issues a perceptible warning and causes the door or liftgate to open without requiring further response from the user, other than his remaining in the vicinity. This high degree of automation appears excessive in many situations, such as where the user has any of countless other reasons for remaining near his car.

Capacitive sensing is a method of detecting the change of capacitance on a sensor due to the user's touch. A capacitive touch system can provide an interface or button for opening a liftgate in response to touch. Capacitive sensing employs a conductive or metal sensor pad, which usually is a metal-fill area placed on a printed circuit board (PCB) and connected by traces to a microcontroller that monitors capacitance of the sensor pad. As the environment changes around the sensor, the capacitance of the conductive material relative to ground will change. The sensor pad serves as one plate of a capacitor. The remainder of the interface or button is variable in design.

In one type of design, a conductive target or metal cover is suspended over the sensor, providing the second conductive surface for the sensor capacitor. A fascia or top surface can be applied over the target. A spacer between the PCB and the target establishes a space between the sensor and the target. When a user pushes the target toward the sensor, much like pushing a button, the spacing changes between the target and the sensor and produces a detectable change in the sensor capacitance. The suitably programmed microcontroller continuously reads the capacitance of the sensor and measures the change in capacitance. Upon detecting a significant change, the system triggers the opening of a liftgate.

In another type of capacitive touch sensor design, an overlay is adhered to the top of the sensor pad. The overlay typically is nonconductive. Glass and plastic materials are suitable. The user's finger is applied to the top of the overlay, which changes the capacitance of the sensor pad. The microcontroller detects the shift in capacitance.

Another available technology for automatically opening a liftgate is capacitive proximity detection. This technique offers a suitable interaction with the user without having physical contact. Capacitive proximity sensing is a method of detecting the change of capacitance on a sensor due to the user's proximity. Various chip makers offer a suitably programmed microcontroller solution for monitoring the capacitance of a sensor and watching for a significant change. A signal shift due to proximity will be significantly smaller than a touch signal because it must work over long distances and through air, rather than through a plastic or glass target or fascia.

Capacitive proximity sensing employs a sensor, which usually is a metal-fill area placed on a printed circuit board. Conventionally, a front panel overlies the exposed face of the sensor and PCB. The sensor acts as one plate of a capacitor. A second side of the capacitor is ground, which may be a ground plane or a ground trace on the printed circuit board.

A number of considerations can affect the operation of a proximity sensor when mounted on a metal vehicle. If a ground plane or other metal surface is directly adjacent to the sensor, it will result in decreased range of proximity detection. In free space, a sensor emits its electric field in all directions with little attenuation. If a ground plane is placed between the sensor and an approaching object, such a ground plane effectively reduces the detection range of the sensor and blocks the sensor from seeing the approaching object. The electric field lines from the sensor tend to terminate on the ground plane, such that the strength of the radiating field decreases as the distance between the ground and the sensor decreases. When a ground plane is directly adjacent to the sensor, range and sensitivity are decreased due to an increase in base capacitance.

A capacitive proximity detection system operates to detect an approaching or proximate user. The system scans the sensor and detects changes in capacitance. The human body is strongly coupled to the earth ground. In systems that employ earth ground on one side of the capacitor, the detection distance is large. When the user gets close to the sensor, the coupling between the sensor and the surrounding ground plane is strong and the system has maximum sensitivity. In systems that are battery-powered, both the sensing system and the human body have coupling capacitance to earth ground, and the human body usually can add more coupling between the system and earth ground. For the system to have good sensitivity for the proximity sensor, the system and the human body should have a good coupling.

While these various technologies might be applied to system for hands-free entry into a vehicle, it would be desirable to apply them in a way that responds to the user's clearly expressed intention while requiring no special dexterity of the user.

Installing a hands-free entry system during original manufacture of a vehicle is convenient and allows system components to be blended into the design of the vehicle. However, a hands-free system also is desirable as an aftermarket addition to vehicles. It would be desirable to have an aftermarket system that blends into the original design of the vehicle.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide a hands-free entry system for a vehicle, where the installed system is substantially undetectable to the observer, such that the system is suited for both original manufacture of the vehicle or aftermarket addition to the vehicle.

Another object is to provide a hands-free entry system for a vehicle, where substantially any user can actuate the system without having special dexterity, but where unintended actuation is avoided.

The invention is a hands-free closure control device that is suitably configured for attachment to a vehicle having an automated closure, to open the closure, in combination with a pre-existing feature of the vehicle that is purposed other than to provide hands-free operation of the closure. The control device provides a proximity sensor radiating an electrical field and communicating with a controller that monitors the electrical field for suitable change, such as would occur by entry of a human into the monitored electrical field within a detectable range. In response to detected suitable change, the controller produces a signal that causes the vehicle's automated closure to open.

The proximity sensor of the hands-free closure control device is a capacitive proximity sensor. A driven shield is suitably positioned at a predetermined spacing from a rear face of the sensor and operated to shape the electrical field to achieve directional detection at the opposite, front face of the sensor. In use with a vehicle, the driven shield can be located between a near portion of the vehicle and the sensor, so as to shield the sensor from the effects of the vehicle's chassis acting as a ground plane with respect to the sensor's electrical field.

A proximate ground plate can be located behind the driven shield, at a predetermined spacing from the driven shield, to reduce ambient interference. During installation onto a vehicle, the proximate ground plate separates the driven shield from the vehicle's chassis. The proximate ground plate and the vehicle's chassis can be joined as a common ground by an interconnection, for example by attaching a mounting screw through both.

According to the invention, a closure control device is operational on a vehicle body that is equipped with a closure that is accessed to open in response to an electrical signal. The vehicle's body provides a surface mounted feature that is purposed other than to operate the closure by hands-free means. The vehicle body operates with a vehicle network including an authorization control system detecting the presence of a person authorized to access the closure; or the vehicle is modified to add an authorization control system. Against this background, a capacitive proximity sensor is configured to have both a front side and a back side, each capable of generating an electric field, wherein the capacitive proximity sensor is mounted at the intended location of the surface mounted feature with the front side thereof facing outward from the vehicle. The surface mounted feature may then be mounted on the surface of the capacitive proximity sensor. A driven shield is arranged to shield the back side of the capacitive proximity sensor from the effects of any proximate ground plane established by the vehicle body and to shift the electric field to the front side of the capacitive proximity sensor, thereby establishing enhanced directional detection to the front side of the capacitive proximity sensor. An electronic control applies preselected criteria, which include at least a change of capacitance to determine when to signal the closure to open. The electronic control is connected for electrical communication with the vehicle network and with the capacitive proximity sensor. From any of these sources, the electronic control receives signals indicating when two criteria are met: that an authorized person is near the vehicle and that an authorized person is proximate to the closure. When the electronic control receives satisfaction of the preselected criteria, it signals to open the closure. As a result, the capacitive proximity sensor is visually blended with a surface mounted feature of the vehicle while it emits a directional field and signals to open the closure when both a person authorized to access the closure has been detected and the authorized person's proximity to the sensor satisfies the preselected criteria.

According to a further aspect of the invention, the preferred surface mounted feature is a license plate, which is intended for mounting at a preselected license plate reception area that is formed in an outside surface of the vehicle and has an outside face and an inside face. The capacitive proximity sensor and the driven shield are mounted at the outside face of the license plate reception area. A back spacer is formed of dielectric material and is positioned at the rear face of the driven shield, and a ground plane is located behind the back spacer and at a controlled proximity from the back of the driven shield. While the license plate reception area, the liftgate of the vehicle, and the vehicle itself constitute one or more ground planes of varying effect, a desirable ground plane is a substantially adjacent grounding plate located at the rear face of the back spacer. The capacitive proximity sensor and the driven shield are arranged in spaced relationship, optionally by placement between them of a sensor spacer formed of dielectric material. A wire transmission passage allows routing wires between outside and inside the license plate reception area where required.

A vented screw is suitable to fasten the back spacer to the license plate reception area. Such a vented screw passes through the license plate reception area and provides a cable transmission passage from outside the license plate reception area to inside the license plate reception area. A conductive cable has a first circuit connected to the capacitive proximity sensor and a second circuit connected to the driven shield outside the license plate reception area. Inside ends of the cable are routed through the vented screw to inside the license plate reception area. Optionally, the electronic control is mounted inside the license plate reception area and connected to the inside ends of the cable. As a result, the electronic control operates from inside the license plate reception area and communicates through the conductive cable with the capacitive proximity sensor and driven shield.

According to another embodiment of the invention, the preferred closure is a liftgate. The surface mounted feature on the vehicle body is a license plate, and the vehicle defines a reception area in an outer surface of said liftgate with an array of fastening locations that match the mount holes of the license plate. The license plate reception area is configured as a portal through the outer skin of the liftgate, and a cover panel is sized to close the portal and is formed of a material that permits ready operation of the proximity sensor through the material. The proximity sensor, driven shield, and electronic control are mounted to the inside of the cover panel.

The accompanying drawings, which are incorporated in and form a part of the specification, illustrate preferred embodiments of the present invention, and together with the description, serve to explain the principles of the invention. In the drawings:

DETAILED DESCRIPTION OF THE INVENTION

Figure 1:
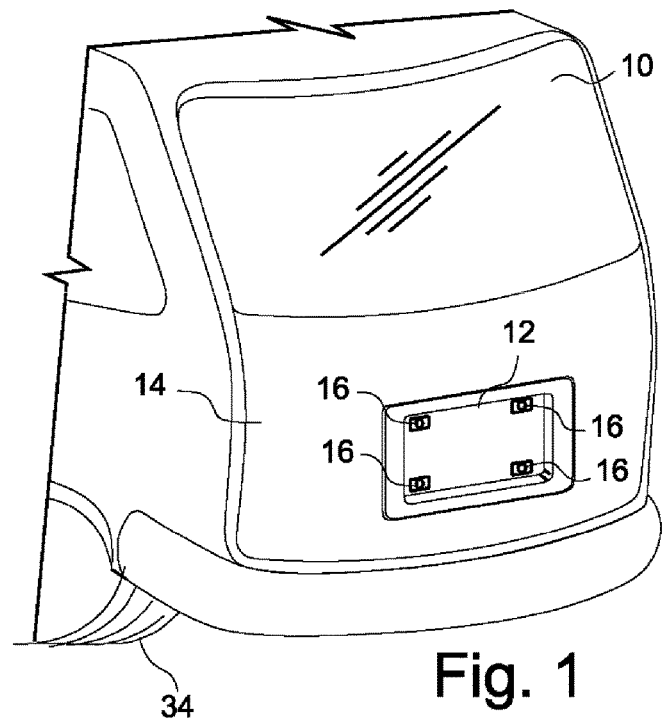
FIG. 1 is a fragmentary rear view of a vehicle showing rear liftgate with license plate reception area with nut plates installed.

Broadly, the invention is a hands-free opener that blends a detection or authorization control device with a pre-existing location for a surface mounted feature of a vehicle.

Surface mounted features might be almost anything that a manufacturer designs a car to receive. Some examples are a tail light, a backup light, a license plate, a manufacturer's emblem, a license plate light, a brake light, or closure handle.

The invention employs a hidden or piggyback arrangement that places a part of the hands-free opener behind the surface mounted feature or even behind the skin of the vehicle. A vehicle is a vehicle that is adaptable to work with a hands-free device for opening a closure such as a liftgate or trunk lid. Typically, a vehicle is adapted to unlatch a closure or lid and then uncover the portal that was formerly closed by the closure or lid by automatically swinging away the closure panel, although the exact function performed by the vehicle is variable and may be a matter of the user's choice. Some cars perform this function only by actuation from a remote transmitter. These cars can be upgraded to function in a hands-free mode. Some cars perform this function by hands-free detection, but the method of operation is difficult. These cars can be adapted to function with the present invention, which offers a remarkably convenient operation.

A specific embodiment of the invention is directed to improvements in location of at least a portion of a hands-free opener for a power liftgate on a car or other vehicle. Particularly as applied to an opener for a liftgate, the invention is the selection of an easily recognized, easily reached vehicle feature that is found on substantially every vehicle—the license plate reception and display area—and the conversion of that feature to function as a capacitive sensing device. Further, the invention is a conversion device that causes the license plate reception area to acquire the additional function of controlling access to automated opening of the liftgate, while such device remains substantially hidden behind a license plate, and while the license plate reception area maintains its functionality to carry a license plate without substantial disruption of associated features such as license plate lighting.

In another aspect of the invention, the sensor portion of a hands-free liftgate opener is integrated into the license plate reception area. Portions of the hands-free opener may be located elsewhere in the vehicle in order to minimize the volume of components added to the license plate reception area and to protect such portions from weather and contamination. Operation of the hands-free opener is enhanced and expanded by integration into a vehicle network, with the result that the hands-free opener can monitor, respond to, and alter aspects of vehicle configuration and status according to the network. By working in a pre-established vehicle network, the opener can cause the network to perform such functions as opening a liftgate without adding an opening device such as an actuating solenoid to the liftgate latch. However, the opener can be adapted to perform a user selected function by adding an actuator for such a function, where the actuator receives and responds to a signal from the opener.

With reference to the drawings, the invention integrates a proximity sensor with a surface mounted automotive feature or the predesignated location for such a feature, such as a license plate recess or supporting structures for a license plate. Conventionally, every car 10 has a license plate or at least a designated structural supporting area 12 for a license plate, which will be referred to, in brief, as the license plate area. Integrating a proximity sensor with the license plate area produces particular advantages to the user who wishes to open a liftgate by use of a proximity sensor or touch sensor. The chief advantages are the ergonomic benefits of placing a sensor at a desirable and accessible location. These advantages are best appreciated by considering that known prior arrangements place the sensor under the car, where the user must employ a kicking motion to actuate the sensor, as described above. In contrast, the license plate area of a car tends to be on the trunk lid or liftgate, where the license plate can be viewed and reached, conveniently.

This same convenient positioning causes the license plate area 12 to be an ideal choice for locating a proximity sensor or touch sensor. From outside the car 10, this area tends to be easily reached by hand, requiring no special bending, balancing, or kicking. While the type of vehicle has been described as a car, the invention can be applied to any type of motor vehicle that has a license plate area or other suitable surface mount feature. Thus, the invention can be adapted to a variety of passenger automobiles and trucks. The main utility of the invention is with vehicles that employ a tailgate, liftgate, trunk lid, or similar closure 14 or the like that the user selectively opens, and often where the closure carries the license plate or defines the license plate area. Typical examples of suitable vehicles include sports utility vehicles, vans, and minivans. The liftgate 14 of other applicable closure of this style of vehicle typically has a license plate area defined on the closure, itself. Often the license plate area provides an array of appropriately positioned mounting aids for receiving fasteners that will hold the license plate. The mounting aids may be nut plates 16 that are set into the outer wall of the license plate area, especially where the license plate area is on a liftgate. In the ordinary structure and operation of a license plate area, screws or bolts that carry the license plate and a license plate frame, if used, enter the nut plates and may be long enough to pass through a nut plate and enter the interior of the liftgate. The interior of a liftgate typically is a cavity that is several inches thick and contains the liftgate latch and other mechanisms.

The use of the license plate area 12 not only provides an ideal location for a user to reach a sensor, but it also provides four further features that advance the technology of hands-free opening of the liftgate 14. One feature is that the license plate area is readily identified by any user, leaving no doubt about where a proximity or touch should be directed. Otherwise, in the present state of technology, the new user is left in doubt about what he should do to open the liftgate: kick under the car, touch some unknown locale, or approach some unknown part of the car?

Second, the license plate area is an ideal location to mount an after-market sensor system or even an original equipment sensor system. People typically want to keep the original clean lines of the car and do not want to attach an object that disrupts those clean lines. Therefore, being able to piggyback an aftermarket addition to a pre-existing structure on the car enables the aftermarket addition to be added unobtrusively to the original design. Often the license plate area is recessed, which further enables the addition of a thin device behind the license plate while preserving the original, clean lines of the car design.

Third, the license plate area provides a reliable, structural foundation for supporting an aftermarket addition to a car. Different vehicles may vary in design such that an aftermarket sensor can be difficult to position across the variety of different car designs. However, the license plate area on all vehicles tends to be uniform in providing a flat area of predictable size and in a position that is readily viewed. Further, the license plate area provides fastener bases such as nut plates 16 that are versatile enough to carry different loads, such as different license plate frames. An aftermarket addition can be configured to attach to the provided fastener bases, which is highly desirable because any need to drill new mounting holes or the like through the skin of the car is minimized or eliminated.

Fourth, the license plate area typically provides physical access to the interior of the liftgate. The original manufacturer of the car typically provides square holes through the skin of the liftgate. Square nuts or nut plates 16 snap into these holes and are bored to receive license plate screws or bolts. Thus, the screw holes through these nuts are in communication with the interior of the liftgate. This pre-existing communication provides a passage for a wire from a first device in the license plate area to a second device sheltered inside the liftgate. The ability to employ such two-sided placement allows the structures on the outside of the liftgate to be small or thin and readily hidden or at least unobtrusive, while larger or thicker components can be housed inside the liftgate. Of course, some cars may have other communication between the outside and inside of the liftgate, such as passages for wires leading to exterior license plate lights. However, the placement and availability of such other passages is not predictable from car to car; whereas, a license plate nut 16 is predictable as to both placement and availability, due to the periodic need for the user to mount the license plate.

Figure 2:
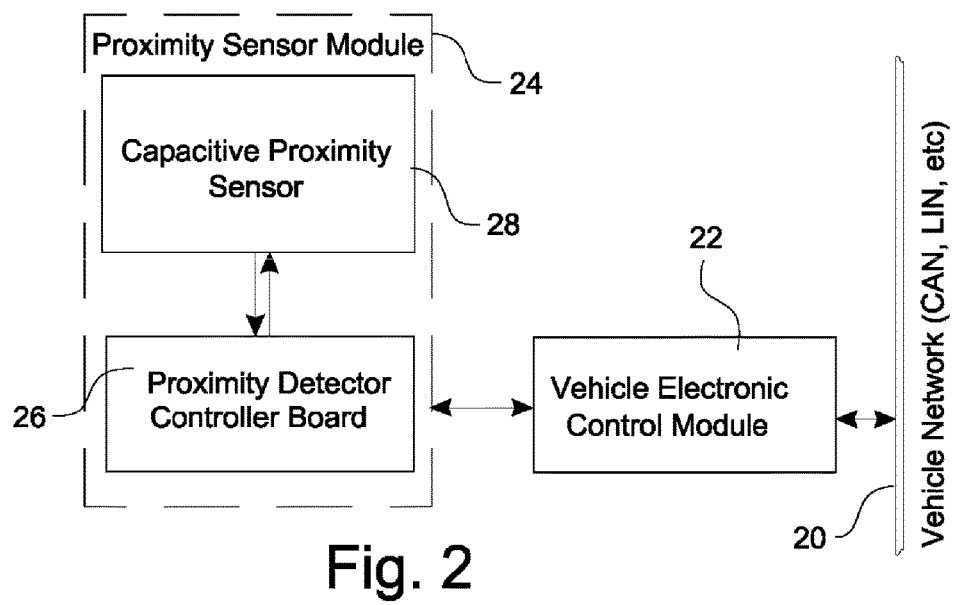
FIG. 2 is a schematic diagram of a proximity sensor system integrated into a vehicle network for opening a liftgate.

As an after-market addition to a suitably equipped car, the hands-free power liftgate system of FIG. 2 is readily applied to a car that is equipped with a smart key. While the details of smart key technology may differ among different car manufacturers, models, and year of car, such technology typically provides the user with a sophisticated electronic key or key fob that communicates with a vehicle network 20 through an antenna in the car to authenticate that the key or fob is near the car. Various known vehicle networks 20 include local interconnect network (LIN) communication and a controller area network (CAN bus). In response to the detected nearness, network 20 in the car can take certain automated actions, such as transferring an authentication code to various control units in the car. For example, a control unit might unlock the car or enable a push button car starter. Authentication of the user, alone, may be sufficient for the car to perform certain functions, which chiefly will be those that can be reversed when the smart key no longer is close to the car. For example, the car doors can be switched to locked position, and the push button car starter may be disabled.

The hands-free liftgate system provides a vehicle electronic control module 22 that communicates with the vehicle network 20 to logically recognize when the smart key is near the car. However, it is not always desired to open a power liftgate for the sole reason that the smart key has approached. The ECU 22 is programmed to require more specific confirmation that opening a liftgate is an appropriate action. The specific confirmation is by monitoring performance of a logical proximity sensor module 24 that is logically linked to operation of the power liftgate. If the user complies with required criteria, such as approaching the proximity sensor to a specified nearness and for a specified time period, the control module 22 has received the sort of specific confirmation that can authorize opening a liftgate. However, the satisfaction of the nearness and time criteria are not enough, by themselves, for the liftgate to be opened. A convergence is necessary of both the general authentication that an authorized person has arrived and the specific, proximity indication that the liftgate should open. In order to obtain this convergence, it is necessary that two sensors are operating or, at least, two sensory reading are detected. One of the sensors may operate first and then trigger the other, or both may operate simultaneously. The ECU may be programmed to determine the sequence of operation.

The power liftgate system also is adaptable to cars that are not equipped with a smart key. By using the liftgate system of FIG. 3, a hands free function can be added to cars equipped to open the rear gate by using another type of automatic system, such as a system triggered from a push-button remote control or the like. Without the benefit of a communication system as employed with a smart key, a different proximity and authentication system can be employed using RF communications, such as Bluetooth. The vehicle electronic control module 22 can be modified by the optional addition of Bluetooth proximity and authentication module 30. A Bluetooth module 30 can authenticate the user by communicating with a smartphone, smartwatch or additional keytag via Bluetooth. The detection range of a Bluetooth module is a few feet from the car, provided the user has a smart phone, and Bluetooth is turned on and previously paired with the vehicle electronic control module 22. Other, alternative methods of authentication optionally can be employed. An example is near field communication (NFC).

The detection systems that have been described, employing smart key, Bluetooth or other RF, and proximity sensors, provide enabling examples of when and how a liftgate might be triggered. Different or additional systems might be employed, as well, with variations in software choices for operation. In any event, an aftermarket system will provide at least an operating, logical proximity sensor that is adapted to monitor preselected criteria that are specifically chosen to determine when the power liftgate might be opened.

According to the configuration shown in FIG. 2, a logical proximity sensor module 24 is composed of two logical elements: a proximity detector controller board 26 and a capacitive proximity sensor pad 28. Controller board 26 is any entity that can perform calculations or other manipulations of data. By way of example and not limitation, it may include a printed circuit board carrying a processor, such as a general purpose microprocessor, a microcontroller, an application specific integrated circuit, or any programmable logic device. In addition, it may include any storage device or medium such as a memory. The proximity detector controller board 26 can be a part of either a physical proximity sensor module 24 as shown in FIG. 2 or the physical vehicle electronic control module (ECU) 22. Physically locating the proximity detector controller board 26 in ECU module 22 as shown in FIG. 3 is helpful to avoid having board 26 in contact with a harsh automotive environment.

A capacitive proximity sensor pad 28 can be a metal-fill area or plate that is logically connected to the proximity detector controller board 26. When actuated, the controller board 26 scans the proximity sensor pad 28 to determine capacitance of the sensor pad and to watch for a significant change. The controller board 26 can monitor and apply other preselected criteria to determine when to open the liftgate or other closure panel. Such criteria can include, but is not limited to, the length of time that capacitance of the sensor pad has changed. The metal sensor pad can serve as the medium for an electric field. While the sensor pad 28 acts as one side of a capacitor, an approaching entity such as a human body serves as the opposite side of the capacitor, similar to a ground trace. Best operation of the logical proximity sensor module 24 depends upon a small signal shift. In turn, the ability to detect a small signal shift is aided by a good signal-to-noise ratio. Because a capacitive proximity sensor pad 28 can be a metal-fill area or plate, the capacitive proximity sensor can be a metal license plate, itself, when the system is suitably modified to operate in this mode. As an example, converting a metal license plate to function as the proximity sensor pad requires an electrical connection from the controller board 26 or ECU 22 to the metal license plate.

Figure 3:
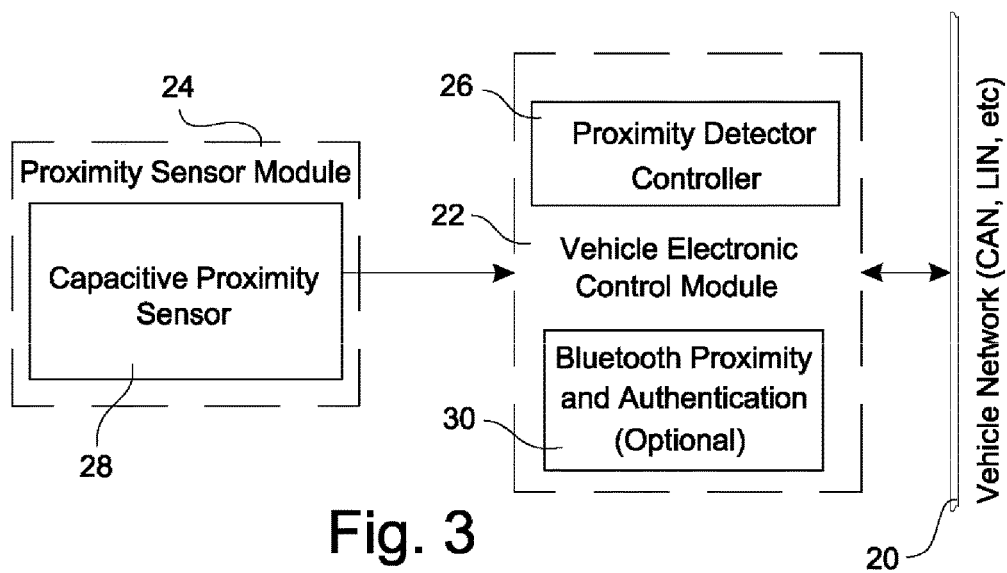
FIG. 3 is a schematic diagram similar to FIG. 2, showing an alternative arrangement of components.
Figure 4:
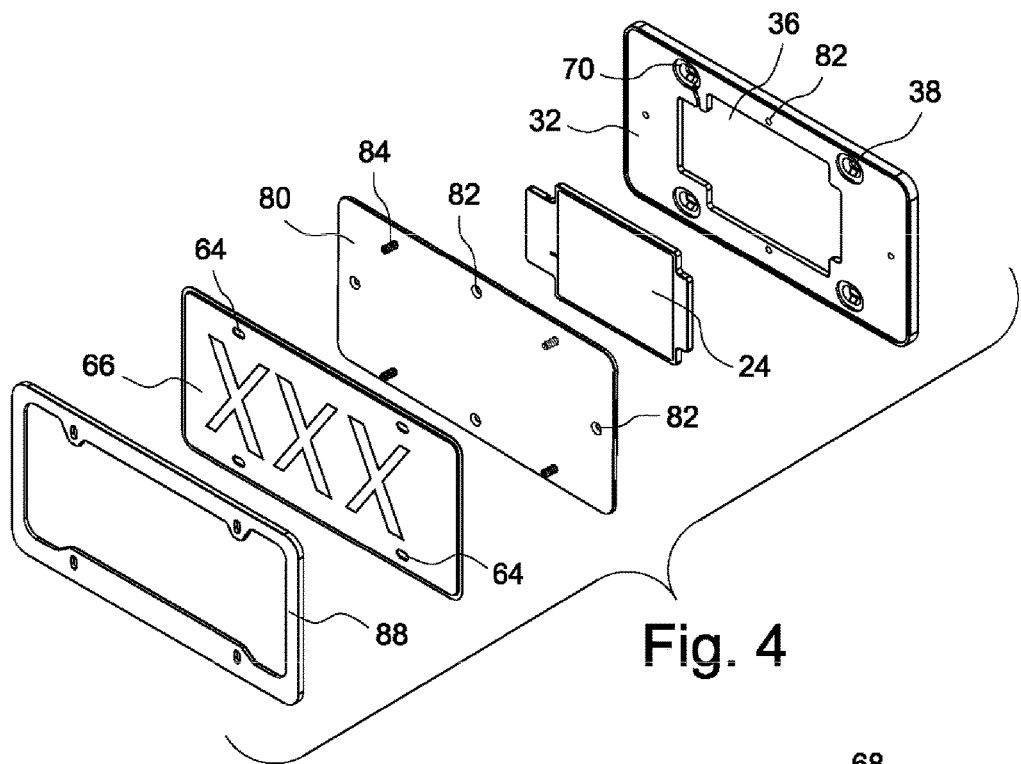
FIG. 4 is an exploded view of a proximity sensor system showing back cover, sensor, front cover, license plate, and license plate frame, with the system suited to operate from behind the license plate of a vehicle.
Figure 11:
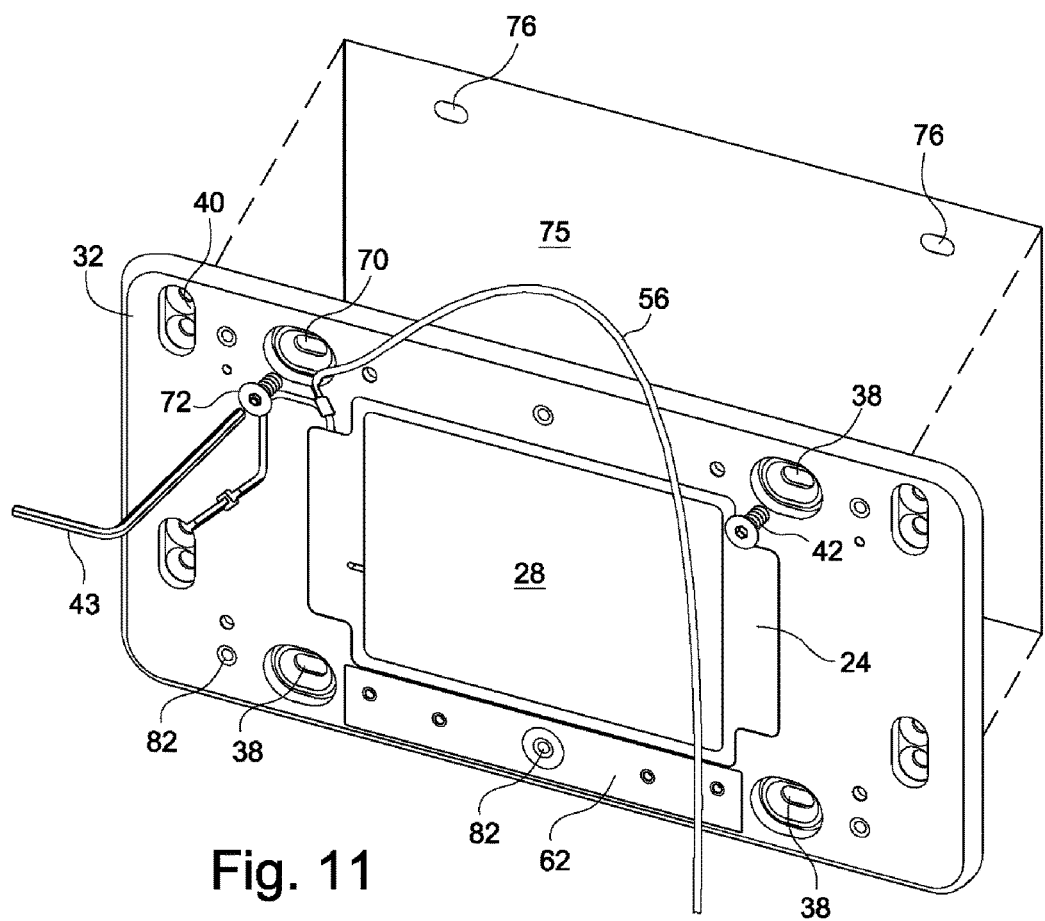
FIG. 11 is an isometric view of the back cover of the liftgate opener with an attached ground plane on its rear face.

In order to maximize range detection with high signal strength and low noise, the logical proximity sensor module 24 of FIG. 2 or 3 is sized and positioned to establish a substantial distance between the proximity sensor pad 28 to the neighboring ground plane created by the metal car body. With reference to FIGS. 4 and 11, an optional back cover 32 spaces the physical sensor module 24 from the car body, which typically functions as such a ground plane. Reference to a back cover refers to a cover placed between the proximity sensor pad 28 and the car 10 with the proximity sensor's direction of sensory operation being primarily in the opposite direction from the back cover 32, regardless of whether the proximity sensor 28 is aimed to look forward, rearward, or in another direction relative to the car 10. While the car body typically is both large and metallic, it does not necessarily reduce detection distance as happens with a fully effective ground plane. The effectiveness of the car body as a ground plane is limited by rubber car tires 34, FIG. 1, between the car and earth. Back cover 32 also helps detection by the sensor module 24 by spacing the sensor module from the car body.

Minimizing sensor movement in the system can prevent false triggers. The physical sensor module 24 fits within a recess 36 in the dielectric back cover 32 to secure the physical sensor module 24 in place. The back cover 32 both holds the sensor module 24 in place and provides a seal against moisture reaching the proximity sensor 28. Various pre-located fastener mount positions 38 are arranged at selected spacing and in a pattern or array that anticipates applying the back cover 32 to pre-positioned nut plates 16 or other fastener reception devices in a standard array of license plate mounting locations on a vehicle 10. Fastener positions 38 are formed with multi-level recesses so that a mounting screw will be recessed to the deepest location, and a seal placed over the mounting screw also will be recessed to a lesser level or at least flush with the face of the back cover 32. Until used, the fastener positions are closed, such as by a frangible web or seal of plastic. While many vehicles employ a pattern of four mounting locations for a license plate, some vehicles may only supply an array of two mounting locations, typically with both at the top of the license plate area. In this latter group, the unused mounting locations remain closed in order to perpetuate the seal. The same back cover 32 may be configured with different initially sealed fastener positions 40 arranged in patterns to match the standard mounting patterns of different regions or nations. The preformed fastener positions are configured to receive a close fitting screw, such as an Allen head screw 42 that has a flat head and conic taper toward the threaded shaft of the screw, which fits into the preformed fastener positions, leaving no exposed head to interfere with subsequent application of a front cover to the back cover. A conventional Allen wrench 43 is suitable to tighten the Allen screw 42.

Sensor range is further maximized by use of a large sensor. In this respect, employing the license plate area 12 offers the opportunity to size the sensor 28 to approximately the size of the license plate. As best shown in FIG. 4, the proximity sensor module 24 is sized to be nearly as large as the license plate, while allowing room for mounting screws at locations 38 that will align with the positions of nut plates 16 on the car 10.

An active or driven shield is used to minimize base capacitance by reducing the electric potential between the sensor and its surrounding environment. An active or driven shield can shield a sensor 28 from a ground plane, which otherwise would lower the signal-to-noise ratio by either increasing the base capacitance or by generating an interference signal near the sensor. The size and shape of the shield are significant variables in application of the shield, as is the position of the shield relative to the sensor 28. An active shield also shields the sensor from surrounding low-impedance interferences. By using active shield technology with sensor 28, the electric field is shaped to achieve directional detection. In contrast, the use of a grounded shield would tend to decrease the sensitivity of the sensor 28.

One conventional version of such a shield is formed of a hatched guard plane behind the sensor 28 on the back of the sensor module 24, which results in the detection range being directed primarily outward from the outer or exposed face of the sensor module, opposite from the position of the shield. The preferred shield 44 is formed of a metal pad. As previously explained, references to the back or rear face of the sensor module 24 refers to the opposite side from the direction the sensor is looking. Reference to the physical sensor module 24 is to the spaced apart combination of a proximity sensor pad 28 and a driven shield 44.

Figure 7:
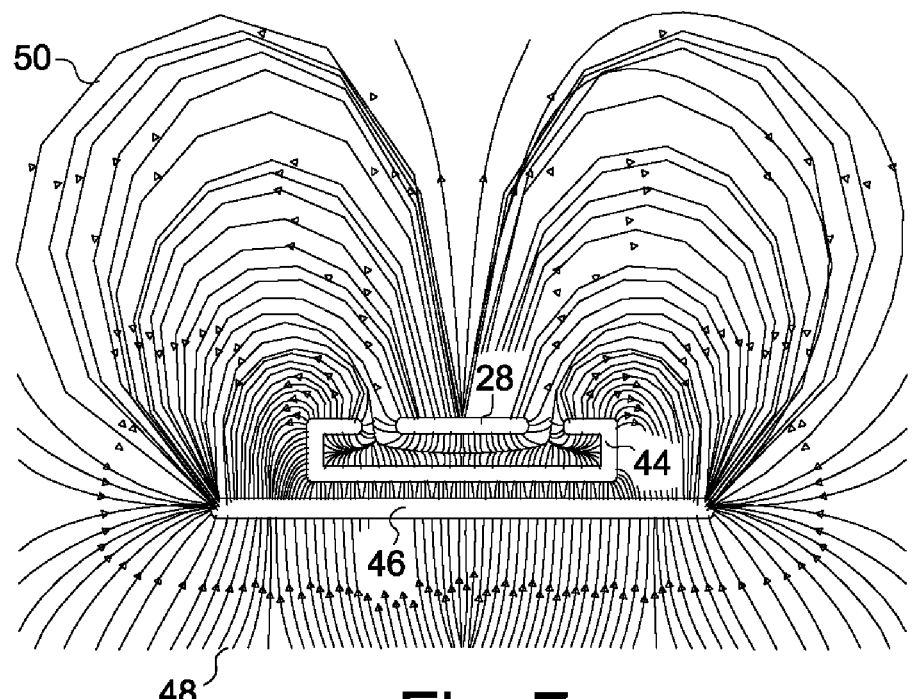
FIG. 7 is an electric field line pattern for a proximity sensor positioned on one side of a chassis ground, separated by an active guard feature.

With reference to FIG. 7, the interaction of an active or driven shield 44 on an electric field near a chassis ground 46, such as a car body, is to attenuate the field 48 facing the chassis ground 46 and to extend the field 50 facing away from the chassis ground 46. Conventionally, a vehicle body 46 is mostly made of metal. Without the use of a driven shield 44, the presence of this massive metal surface near the sensor 28 would effectively reduce the detection range of the sensing system and increase base capacitance, which decreases the percentage of change in the signal, resulting in a lower signal to noise ratio (SNR) when a triggering object is in proximity to the sensor 28.

With reference to FIG. 7, chassis ground plane 46 may be replaced or supplemented by a further, additional or separately located ground plane that is spaced by a predetermined distance to the rear of the driven shield to reduce or eliminate ambient interference and false triggering. Thus, the closure control may provide the package including the sensor, driven shield, and separate ground plane, with all three components carried at spacings suited to support their performance. During installation of the package, the separate ground plane can be grounded to the vehicle chassis so as to have the same ground potential as the vehicle chassis, but with reduced interference.

In free space, a sensor can emit its electric field freely in all directions with little attenuation. When a ground plane 46 is introduced, the electric field lines emitting from the sensor 28 will tend to terminate at the ground plane. As the distance between the ground 46 and the sensor 28 decreases, the strength of the radiating field also decreases. Consequentially, as a ground plane 46 is placed increasingly close to the sensor 28, the sensing range is effectively reduced. Because a license plate normally is located in close proximity to the ground plane defined by the metal surface of the vehicle, the sensing range of sensor 28 could decrease dramatically. A driven shield 44 minimizes the base capacitance by reducing the electric potential between the sensor and vehicle chassis, and it also shields the sensor from surrounding low-impedance interferences. A driven shield also can be used to shape the electric field to achieve directional detection without decreasing its sensitivity, as otherwise might occur due to presence of a ground plane established by the vehicle chassis 46. By changing shape and location of the driven shield, the detection range of the sensor is adjusted as required.

As earlier noted, U.S. Pat. No. 5,166,679 to Vranish et al is incorporated by reference herein for its teachings of driven shield technology. Vranish describes an early application of driven shield technology, wherein a shield is driven at the same instantaneous voltage as a capacitive sensor and in phase with the sensor, thus explaining an example of the operation of a shield 44 with respect to a sensor 28, described above. The shield is not frequency sensitive to nearby objects as is the sensor. Thus the sensor is shielded from nearby ground, such as a metal car body. Due to the shielding, the capacitance between the sensor and the nearby ground is substantially reduced if not eliminated.

Figure 8:
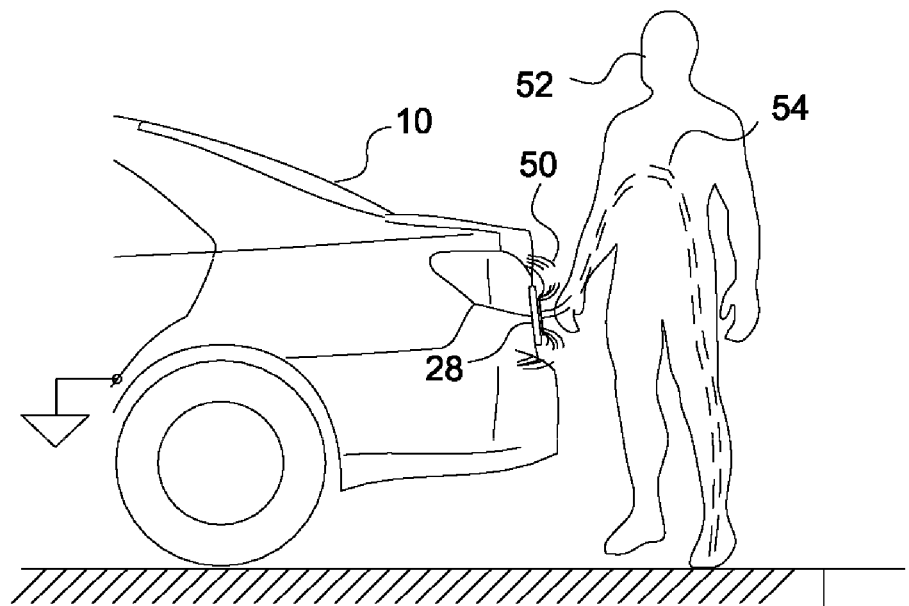
FIG. 8 is a fragmentary side view of a car with proximity sensor establishing an electric field line pattern and with a human user theoretically conducting electric field lines to ground.
Figure 10:
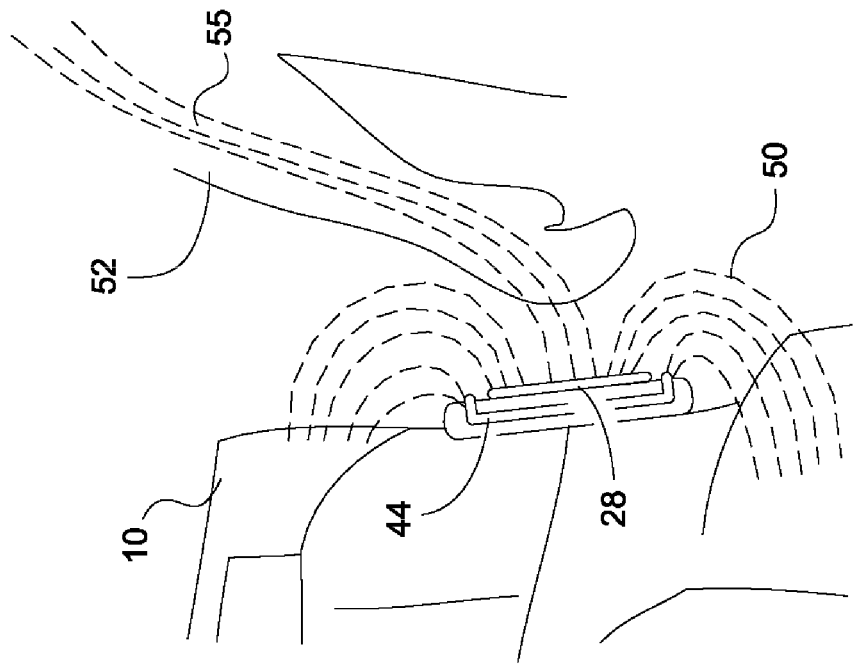
FIG. 10 is an enlarged detail view taken from FIG. 8, showing a greater number of electric field lines in the human user when the proximity sensor employs what are known as an "active guard" or "driven shield" feature.
Figure 9:
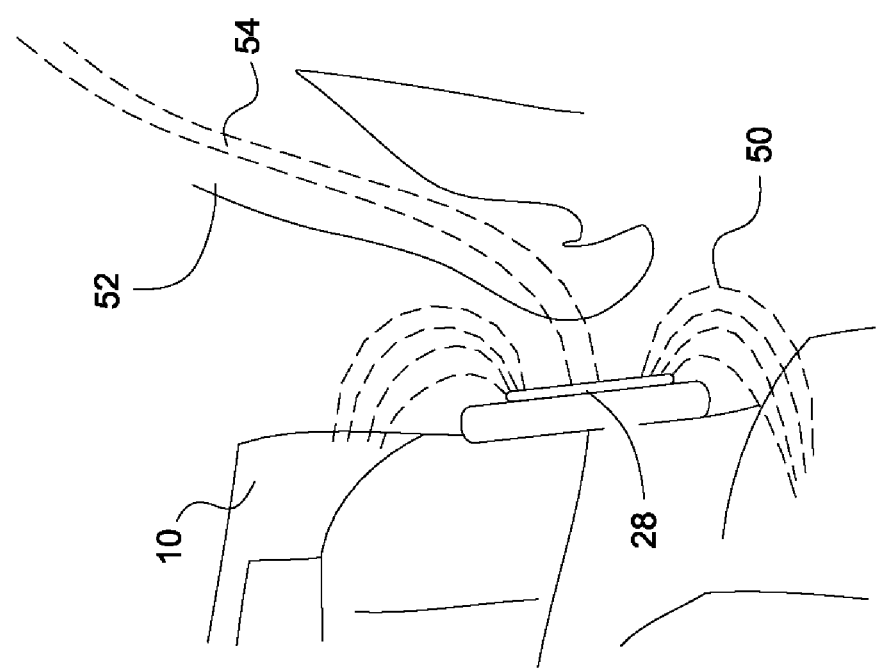
FIG. 9 is an enlarged detail view taken from FIG. 8, showing electric field lines in the human user when the proximity sensor does not employ an active guard feature.

Referring to FIGS. 8-10, the effect of a driven shield is to increase the lines of force between a sensor 28 and a target, such as human user 52. In FIG. 8, the sensor establishes a field composed of lines of force 50. As the target comes into range of the sensor, lines of force 54 are directed to ground through the target, while the vehicle chassis acts as the opposite side of ground. FIG. 9 is an enlarged view showing the sensor without an active shield. The sensor's lines of force 50 engage with the target's arm 52. For purposes of illustration, only two lines of force 54 have been diverted through the target's arm 52 in FIG. 9. In FIG. 10, an active shield 44 is located between the sensor and the vehicle chassis, extending lobes 50, as suggested in FIG. 7. As a result, the sensing field is displaced to be greater behind the vehicle 10, and more lines of force 55 transmit through the target's arm. In FIG. 10, this greater engagement is suggested by illustration of three lines of force 55 in FIG. 10, in contrast to the two lines of force 54 illustrated in FIG. 9.

Figure 12:
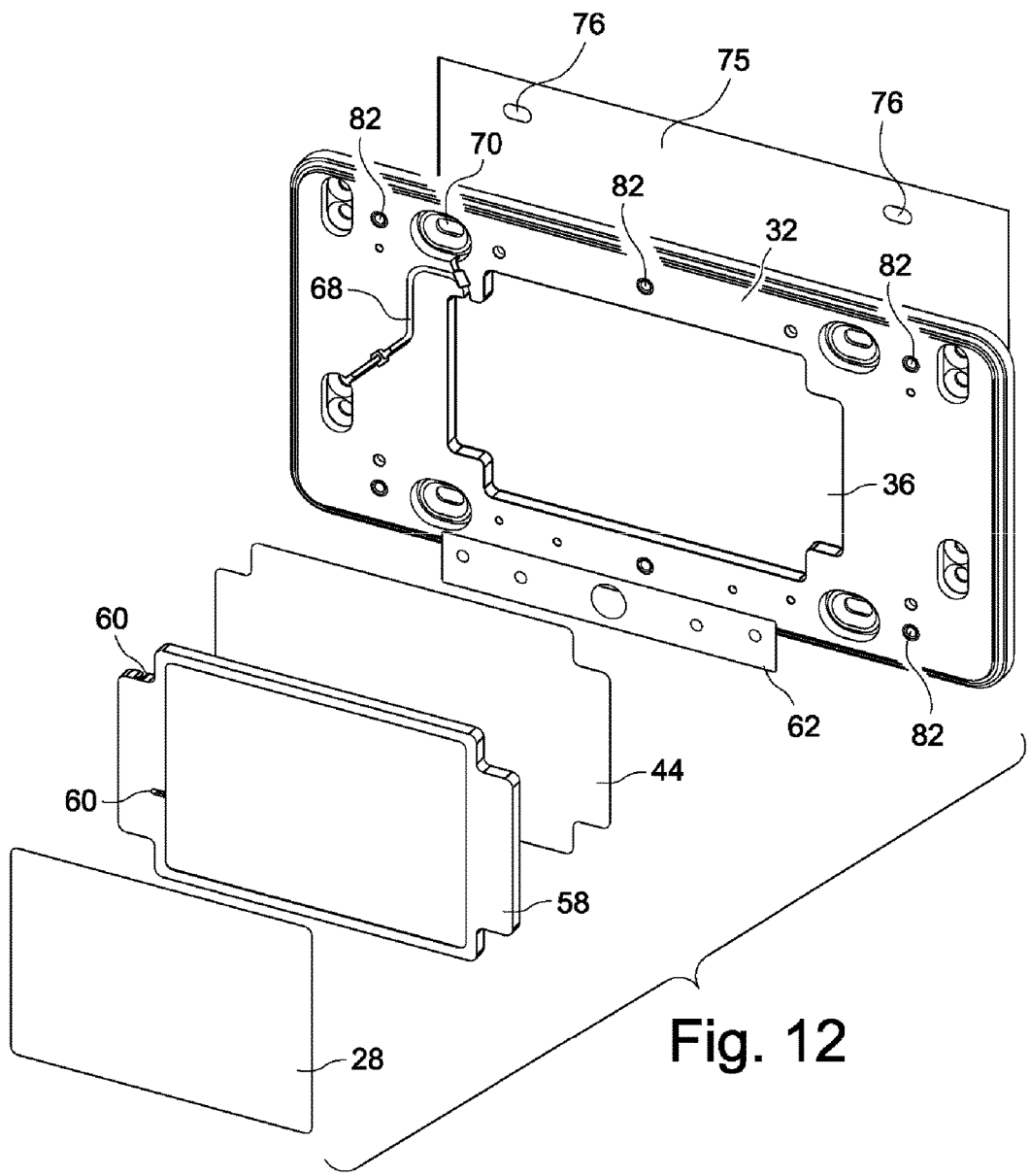
FIG. 12 is an exploded isometric view of the back cover of the liftgate opener, showing assembly of the sensor module with sensor pad and driver shield pad on the front and showing a ground plane on the rear.

With reference to FIG. 12, the physical sensor module is composed of a metal plate defining a sensor pad 28 formed of a sheet of conductive metal such as copper or aluminum and connected by coaxial cable 56, FIG. 11, to an electronic control unit (ECU) 22. Sensor pad 28 is mounted so as to be electrically insulated and spaced from driven shield 44. One way of suitably mounting sensor pad 28 is to employ an optional dielectric carrier and spacer 58. Using carrier 58, the sensor pad can be mounted on the front side or outer face of the carrier 58. If the carrier 58 is formed of rubber, typically the carrier 58 might have a dielectric constant of about 2.4. In place of the carrier, the sensor pad and shield even can be separated by an air gap, which is considered to have a dielectric constant of about 1. Air can be used in the spacing by mounting the shield to the back cover 32 and by mounting the sensor pad to a front cover, which is internally spaced from the back cover by the desired distance. The dielectric carrier 58 serves as an aid to handling the sensor pad 28 and securing the pad 28 in a stable position keyed to recess 36 on the front or outer face of the back cover 32.

The driven shield 44 is a metal pad spaced from the rear face of the sensor 28 and also is connected to the ECU 22 by coaxial cable 56, FIG. 11. Conductive metals such as copper or aluminum are suitable for forming the driven shield 44. The coaxial cable 56, FIG. 11, is formed of both conductive core wire and conductive outer shielding. The core wire may serve as the electrical connection to the sensor pad 28, while the conductive shielding may serve as the electrical connection to the driven shield 44. The carrier 58 provides passages 60 for routing coaxial cable 56 to the sensor pad 28 and to the shielding pad 44 and retaining the cable 56 in electrical contact with both, despite the rough treatment of traveling with a car.

Although the driven shield 44 is quite large, its size can be made greater by use of a shield extension 62, which is a supplemental plate that can be attached to the outer face of back cover 32 immediately adjacent to the spacer 58. Extension 62 is formed of similar material to shield pad 44 and is useful to tune the shape and sensitivity of the field.

A fastening system can protect the sensor 28 from interference while it enables electronic communication between the logical proximity sensor module 24 and the vehicle electronic control module 22 or any other component of the vehicle network. As shown in FIGS. 4 and 11, the back cover 32 defines a fastening matrix formed of mounting positions 38 that are arranged similarly to the pattern of normal license plate mounting holes 64. Nut plates 16 are positioned on the license plate area of the vehicle, FIG. 1, in positions that coordinate with normally positioned license plate mounting holes 64. These nut plates 16 enable the back cover 32 to be mounted on a car 10 that is configured to receive a normal license plate 66.

Figure 5:
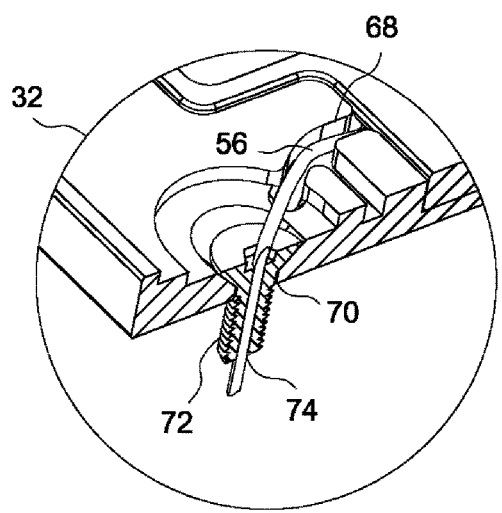
FIG. 5 is an enlarged fragmentary view of a mounting hole of the back cover, showing a vented screw.

With reference to FIGS. 5 and 12, the back cover 32 is configured with an interconnecting wiring channel 68 between the sensor recess 36 and a mounting location 70, which is a selected one of the mounting locations 38. The channel 68 is capable of carrying recessed wires 56 between the sensor module 24 and the selected mounting location 70. A special vented mounting screw 72, FIGS. 5 and 11, is applied through location 70. The special vented screw 72 is configured with a longitudinal bore 74 sized to pass the wire 56 as suggested by the arrow 71, FIG. 13, extending through the bore of screw 72 at location 70. The wire is inserted through the bore after the screw 72 is fastened through location 70 of back cover 32, thereby automatically routing the wire through the corresponding nut plate 16. The wire then is routed into the interior of the liftgate 14, where the wire is connected for communication with any chosen component, such as the vehicle electronic control module 22 inside the liftgate. The carried wire through vented screw 72 seals the passage through the nut plate against admitting contamination into the interior of the liftgate. The longitudinal bore 74 is configured with an Allen head socket at its head end so that the vented screw can be fastened by a conventional Allen wrench. The longitudinal bore incorporates the Allen socket, which is well suited to accommodate the subsequent passage of a wire due to the relatively smooth profile of an Allen socket as compared to various other styles of socket configuration.

Particularly in an opener installed on the outside of a car, it is possible to encounter false triggering of the liftgate. This problem can arise from the presence of too much spacing between driven shield 44 and the chassis ground plane 46. A solution to this problem is to place a proximate ground plane 75, FIGS. 11 and 12, at a controlled, predetermined spacing behind the driven shield 44 and spaced in front of the chassis ground plane 46. A suitable spacing behind the driven shield is about 2-3 mm, which places the proximate ground plane 75 at about the same distance from the driven shield as a suitable thickness of back cover 32. This proximate ground plane can be formed of conductive metal such as aluminum. It is sized to be larger in height and width than shield 44. Conveniently, it may be wider and taller than the spacing of fastener positions 38, 70 so that it can share the mounting to the car of back cover 32 using fasteners 42, 72. The proximate ground plane 75 can be configured with fastener holes 76 aligned with corresponding fastener positions 38, 70 of the back cover 32. The fasteners 42, 72 engage the proximate ground plane 75 at holes 76 and provide a ground connection to the chassis ground 46. Thus, the proximate ground plane and the chassis ground plane can be coupled by a junction so as to be at substantially the same ground potential. When the package consisting of the sensor, driven shield, and proximate ground plane is mounted to a vehicle, the electrical characteristics of the ground plane should remain stable.

Figure 13:
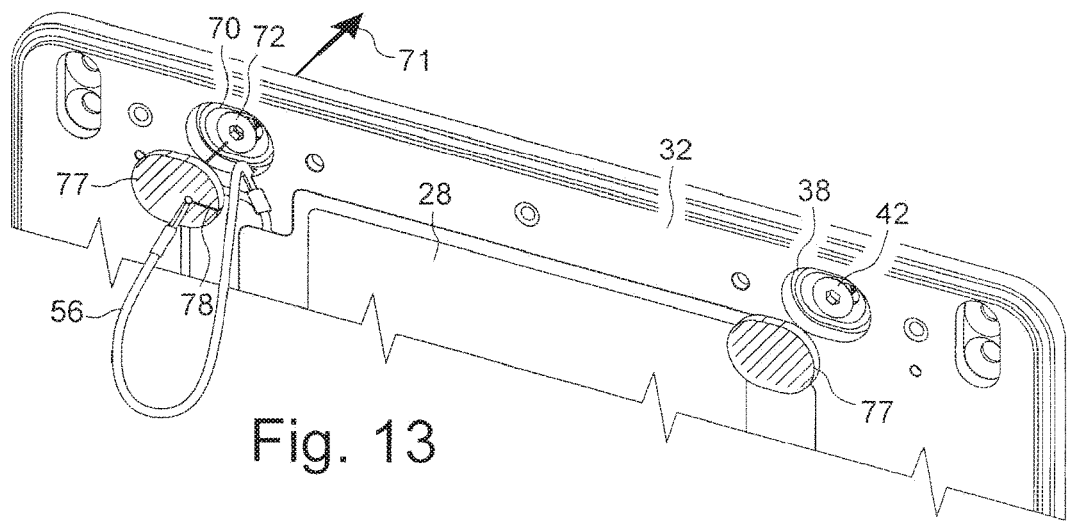
FIG. 13 is a fragmentary isometric view of the top portion of the back cover of the liftgate opener, showing installation of a cable to the ECU from the sensor pad and shield pad with seals at the mounting screw locations.
Figure 14:
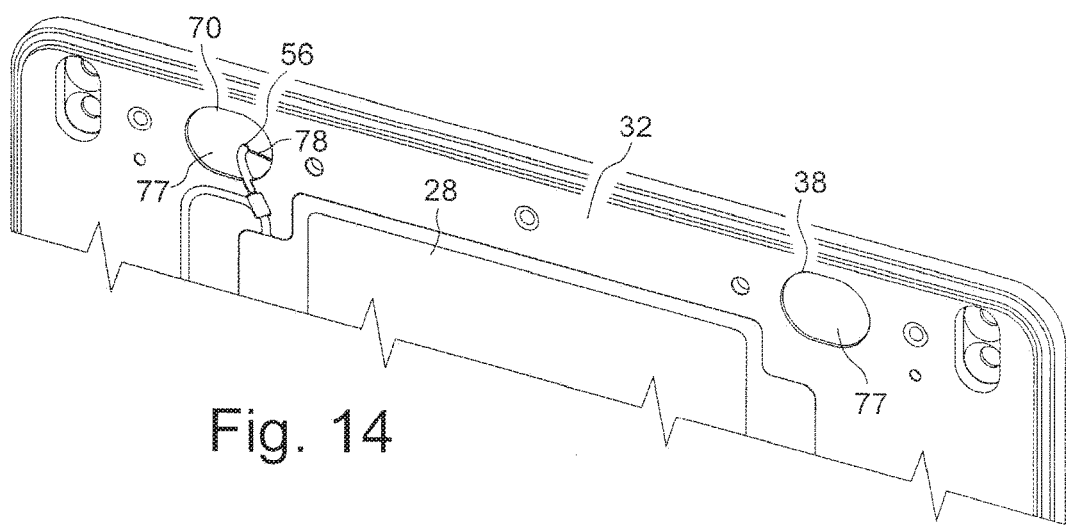
FIG. 14 is a view similar to FIG. 13, showing the seals in place.

With reference to FIGS. 13 and 14, the used mounting locations 38, 70 through the back cover 32 can be sealed by application of a silicon pad 77 that is configured to fit into the preformed recess of each location. The pads 77 carry adhesive on one side, which is applied against the flat head of the mounting screw 42, 72. The sealing pad 77 applied to selected location 70 is adapted to also seal around cable 56. For this purpose, the sealing pad may be formed with a passage that aligns the inserted wire 56 with the bore 74 of vented screw 72. Another effective way of preserving a seal around wire 56 is by a radial styled cut 78 from an edge to approximately the center of the sealing pad 77, which allows wire 56 to be easily inserted through the plane of sealing pad 77 or allows the sealing pad 77 to be clipped easily over the wire. The radial cut becomes sealed tightly when the sealing pad 77 is adhered within the recess of mounting location 70.

Figure 15:
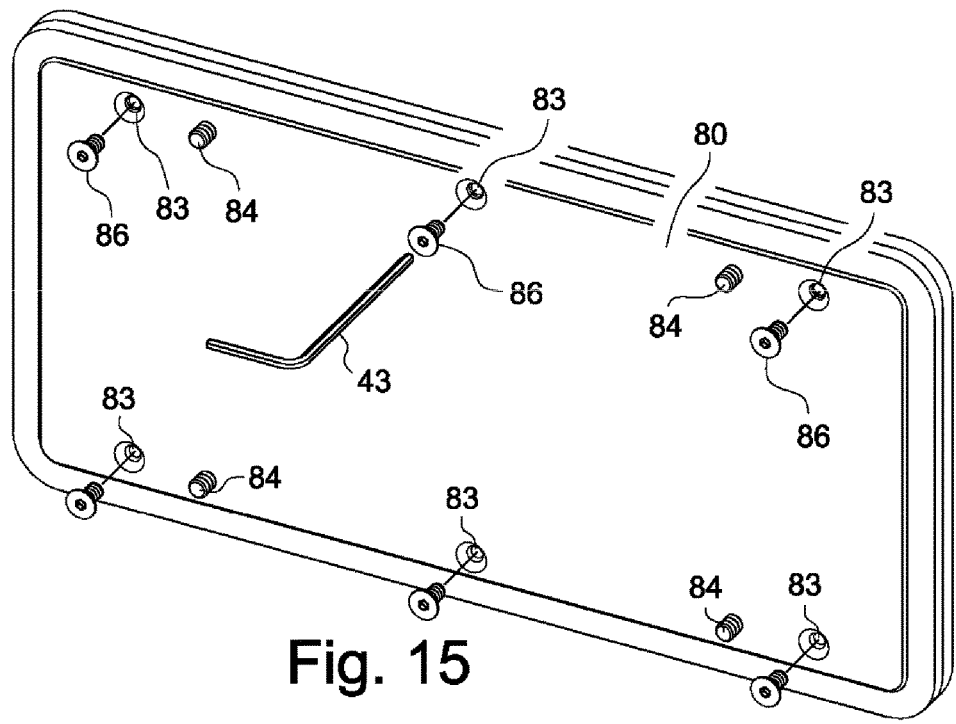
FIG. 15 is an isometric view showing the assembled back cover and front cover.
Figure 16:
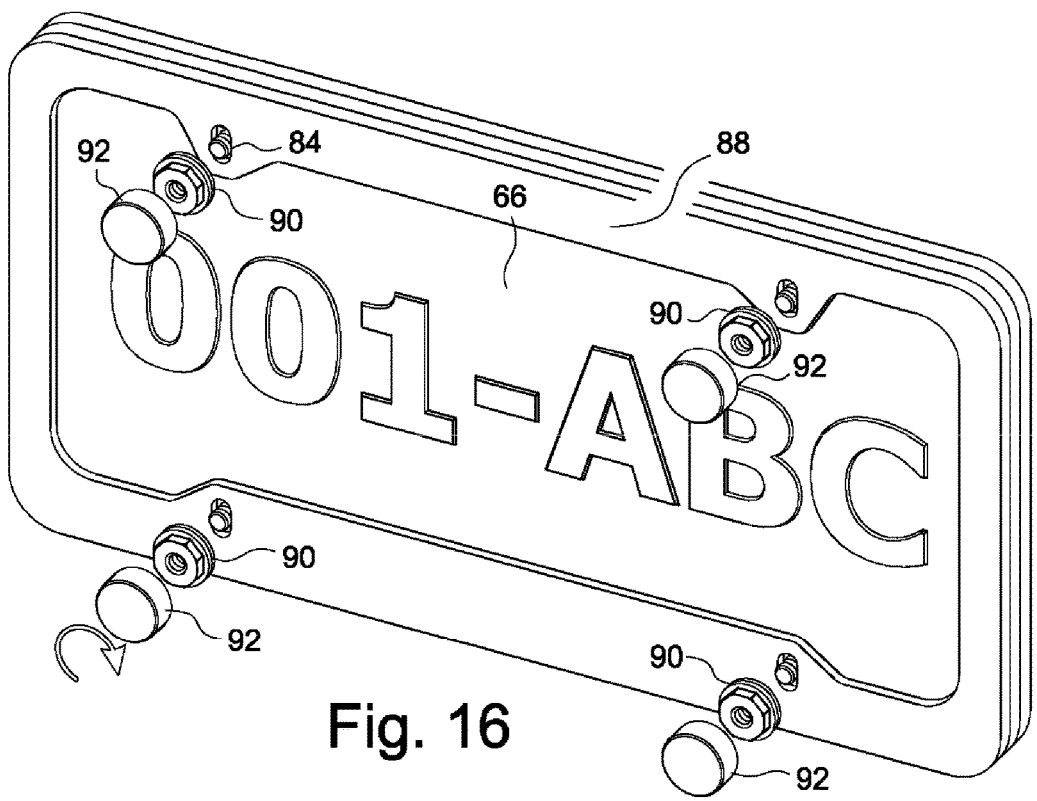
FIG. 16 is an isometric view of the assembled back cover, front cover, license plate, and license plate frame.

With reference to FIG. 15, a front cover 80 fits over the proximity sensor module 24 on the side opposite from the back cover 32. This front cover 80 is formed of dielectric material. It protects the sensor 28 from static electricity and mechanical damage. In addition, because the license plate 66, FIG. 16, is mounted outside the front cover, the front cover 80 is a spacer that separates the normal license plate 66 from the sensor module 24 to enable longer sensor range.

Optionally, the back cover 32, FIGS. 11 and 12, defines alternative mounting locations 82 in an array of positions that are offset or non-matching with the array of normal license plate mounting holes 64. Front cover 80 is equipped with an array of alternative holes 83 that align with the positions of holes 82 on the back cover, which enables the front cover to be mounted to the back cover without the mounting locations or screws interfering with subsequent mounting of the license plate to the front cover. The front cover 80 is equipped with studs 84 in an array of known positions to align with normally positioned license plate mounting holes 64 to receive a normally configured license plate. Various specific types of fasteners, such as bolts, screws, nuts, and clips are subject to interchange, mutatis mutandis.

As shown in FIG. 15, the front cover 80 is attached to the back cover 32 by flat head screws 86 engaged in aligned arrays of alternative holes 82, 83 in respective front and back covers. As shown in FIG. 16, a conventional license plate 66 and, optionally a license plate frame 88, fit over threaded studs 84 for mounting the license plate to the front cover 80. Nuts 90 and screw-on nut covers 92 secure the license plate and frame to the front cover 80.

The use of the assembled back cover 32 and front cover 80 establishes a protective housing for the sensor module. The housing also allows one of the covers, such as back cover 32, to be mounted to a known location on the car where a surface feature such as a license plate was removed, using the original positions 16 of the fasteners for the license plate. The other cover, such as the front cover 80, can receive the formerly removed surface mounted feature, such as a license plate, at fastener locations 84 that match the original mounting pattern onto the car. Optionally, either of the covers 32, 80 can be modified to both mount to the car and to receive the formerly removed surface feature.

Figure 17:
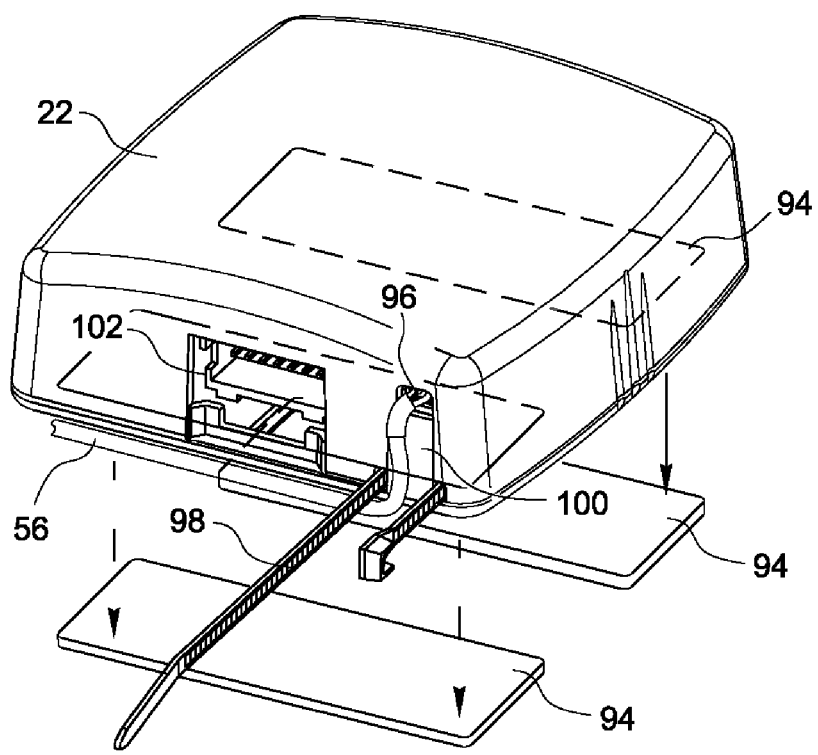
FIG. 17 is an isometric view of an electronic control module and mounting tape.

With reference to FIG. 17, the ECU 22 is preferred to be mounted in a protected location. Suitable protected locations are inside a liftgate or inside a vehicle trunk, where the ECU is not readily exposed to weather. A convenient widely adaptable mounting means employs a two-part fastener 94, also known as hook-and-loop fastener. One side of the fastener is fixed to the ECU, while the second side of the fastener is mounted onto a supporting surface of the vehicle in a user selected location to receive the ECU.

The ECU operates the sensor pad 28 and the driven shield 44. Communication between the ECU and the controlled components may be by wireless system or by suitable wired system. The previously described coaxial cable 56 is a suitable wired connection. The ECU is connected to the cable 56 by a wire push-in junction 96 and is secured to the ECU by a tying member 98, which may be a zip tie that also wraps around a fixed tab 100 on the ECU housing.

Another connection port 102 on the ECU provides a wired connection to vehicle power and to a vehicle network 20, which currently might be a CAN or LIN network. Alternatively, wireless connection to the vehicle networks can be used. The ECU works through a vehicle network to operate the trunk release or liftgate release. By operating in cooperation of the vehicle networks, the ECU can control and configure the vehicle in ways beyond the opening of a liftgate. For example, the ECU can be programmed to lock and unlock doors and to activate or deactivate opening of the liftgate, depending upon whether a door is opened. Door opening can be used as a threshold feature whereby an authorized user is authenticated.

By software, the ECU can distinguish between rain and a solid physical approach to the sensor, thereby avoiding inadvertent opening of the liftgate during rain. The ECU also can be programmed for certain responses, such as closing the liftgate, starting the car, and locking or unlocking the car. These features can be set up and programmed by sensor touches. User recognition can be derived by Bluetooth or RF communication between the ECU and the user's smartphone, smartwatch, and similar personal communication systems.

The vehicle electronic control module 22 regulates the opening operation of the liftgate 14 using the authentication information from the smart key system and the movement or proximity information from the proximity sensor 28. The proximity detector controller board 26 provides information to the vehicle electronic control module 22, such as whether an adequate change in capacitance has taken place at the proximity sensor 28. A preferred system design requires the car's ignition to be off and the car's doors to be locked before the liftgate system will operate. The user approaches the license plate area 12 to a distance of three or four inches, perhaps bringing a hand to this degree of closeness. The user holds his hand position for about one second before the liftgate system acknowledges that it is responding. A buzzer 120 or other device associated with the ECU makes the acknowledgment, after which the user should step away from the car. The ECU then signals the trunk or liftgate to open.

In a preferred, software controlled operation scheme, when a user with a smart key comes close to the car 10, he activates the capacitive proximity sensor 28, thereby initiating the smart key authentication process. When the vehicle electronic control module 22 receives an approval signal from the car, it sends a signal to open the liftgate or trunk 14. Where smart key is not in use, an alternative communication system such as Bluetooth 30 handles authentication. Additional technology for authentication might be employed.

Proximity technology, touch/contact technology, voice recognition, facial recognition, or future technologies yet to be developed may be employed.

Figure 6:
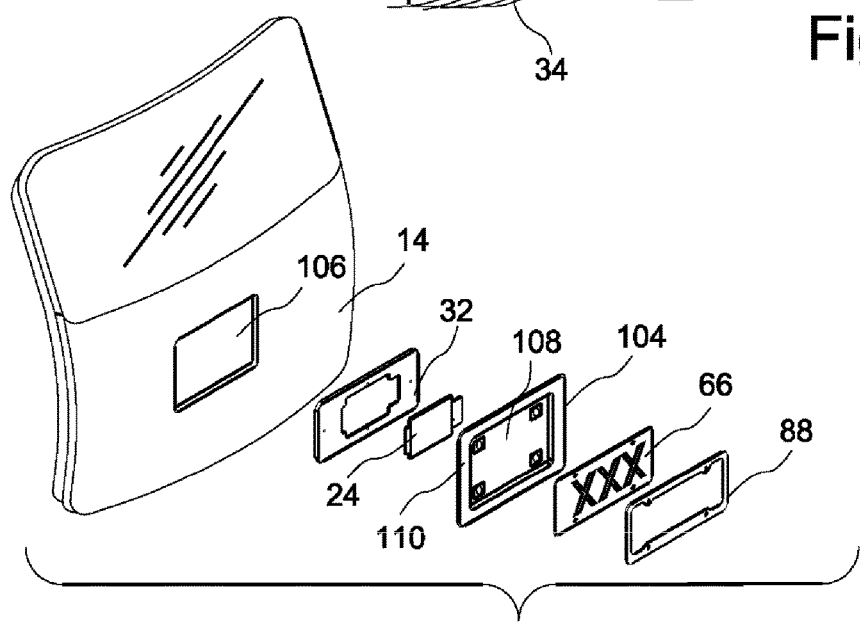
FIG. 6 is an isometric view of a liftgate with a portal at the license plate reception area, and with an exploded view of dielectric panel for closing the portal and additional associated elements of a proximity sensor system.

The power liftgate opener that has been described thus far is suited for addition to a car with little modification to the original structure. With additional modification, the described liftgate opener can be further integrated into the structure of a car to be better suited as a factory-installed item. As described in FIG. 1, the license plate support area 12 conventionally is defined by a physical characteristic, which often is a recess in the surface of a liftgate. Such a defined area 12 can be formed in the material of the outer skin of the liftgate. Alternatively, the license plate area 12 can be supplied as a separate cover panel 104, shown in FIG. 6. The liftgate can be formed with a portal 106 through the outer skin of the liftgate, with a separate panel 104 serving as a cover for portal 106. The cover panel 104 defines a central area 108 that is sized to receive and carry a conventional license plate. The area 108 carries nut plates 16, similar to those previously described, and which might be formed of plastic or other dielectric materials in the embodiment of FIG. 6. The portal is sized to be covered and closed when the cover panel 104 is installed. If the cover panel 104 has a center recess 108 that receives a license plate, this recess 108 may be coordinated in size to the portal so as to be engaged in the portal. A peripheral flange 110 overlaps the outer periphery of the portal and serves to secure the cover panel 104 in place on the liftgate. Other fastening means may be used to secure the cover panel 104 in place.

The portal 106 provides easy access into the interior of the liftgate, allowing components of the liftgate opener to be installed into the interior of the liftgate and conveniently serviced, if necessary. In addition, the cover panel 104 is dielectric or otherwise sensor-friendly to permit the proximity sensor 28 to operate through the cover panel 104. With such a large opening available, the proximity sensor 28 can be installed internally in the liftgate. Optionally, a back cover 32 can be used as an aid for handling and mounting the sensor module 24 or spacing it from limiting structures. A front cover 80, FIG. 15, also is an option in the configuration of FIG. 6, although the cover panel 104 can serve as a substitute for the front cover 80. In this embodiment of FIG. 6, the entire sensor system is internal of the liftgate 14. A license plate 66 and frame 88 can be installed in conventional locations on the outside of cover panel 104.

Figure 18:
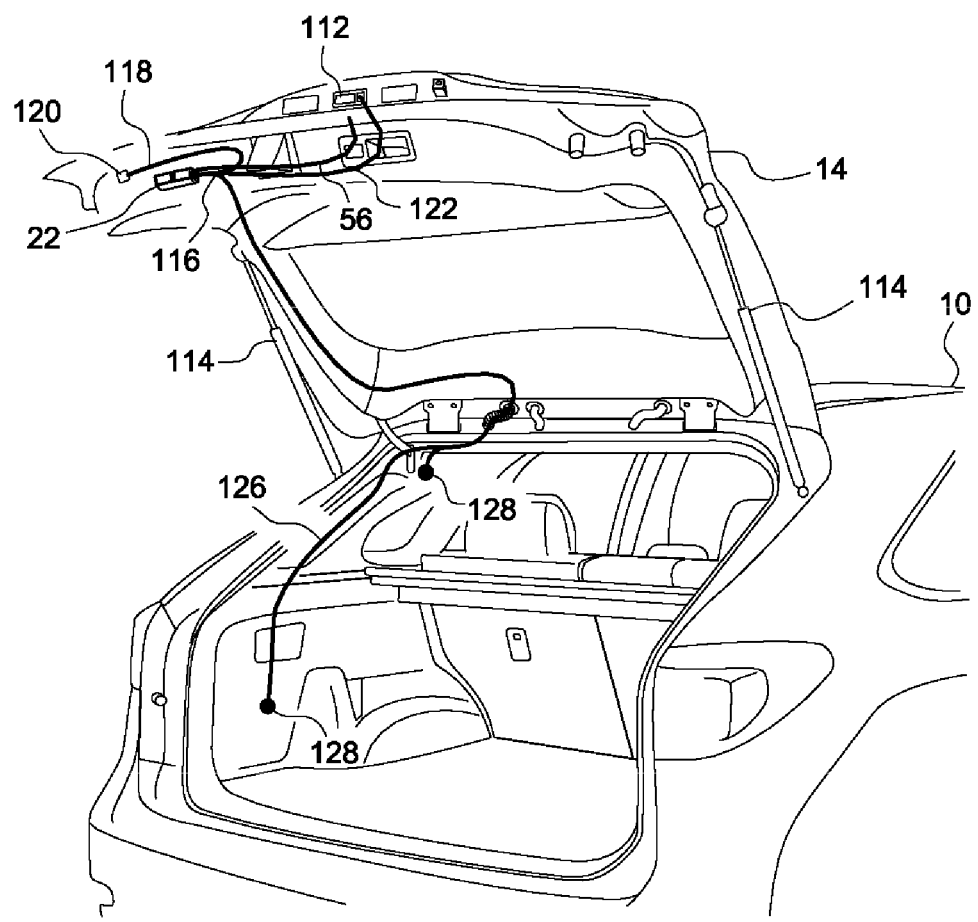
FIG. 18 is an isometric view of a vehicle with the ECU installed and connected to cooperating components.

In a typical installation as illustrated in FIG. 18, the liftgate opener is installed in vehicle 10 that might have a rear closure panel 14 that is either a liftgate or a trunk lid. For convenience, the rear closure panel will be referred to as being a liftgate. The rear closure panel 14 is held in closed and locked position by a latching and locking mechanism 112. Conventionally, a mechanism automatically opens or raises closure panel 14 when the latching mechanism 112 is released. Suitable examples for raising the panel 14 might be gas charged struts 114 or a motorized actuator.

The ECU 22 is mounted in a protected location within the vehicle 10. The location can be chosen based on factors such as access and, where hard wiring is used, convenience of wiring. The ECU 22 in FIG. 18 can be mounted inside the liftgate 14 by using mating sets of hook-and-loop pads, as previously described. From its mounted position, the ECU 22 is wired to other components of the sensor system using suitable conductors such as cable 56 and an interface harness 116. From port 102, FIG. 17, the ECU is wired through interface harness 116 to one or more suitable networks within the vehicle 10, such as the power bus and the CAN bus. One branch 118, which may be referred to as the signal cable of harness 116, connects the ECU to a signal device such as a chime or buzzer 120, which announces operation of the sensor system to the user. Another branch 122, which may be referred to as the trunk release cable, connects the ECU to trunk release 112 for opening the release after a user successfully has operated the liftgate system to open the liftgate. An additional branch 126, which may be referred to as the power and network cable, connects the ECU to vehicle power and vehicle network at connection locations 128 within the vehicle. Thus, the liftgate system can be operated as a component drawing power from a vehicle battery. It can operate through the vehicle's bus systems to perform a wide variety of additional functions. Because the entire system is blended to cooperate with the pre-existing electrical architecture of the vehicle, the system is easily incorporated into the vehicle at the factory or as an aftermarket addition.

The exact choice of location and arrangement of components forming the liftgate opening system is variable. For example, the proximity sensor can be located on the liftgate, trunk, or side door; inside the bumper, underneath the bumper; or implemented into the door handle, door body, trim, under the door, or behind a manufacturer's emblem. It can be any shape or size. The sensor can be mounted behind the license plate or in front of the license plate where it might resemble a license plate frame, and the license plate can be adapted for use as the sensor, itself, by establishing a suitable electrical connection to the license plate.

The opener is complete and functional without further additions. The license plate 66 fits over the front cover 80 but is not required for operation of the liftgate opener except if the opener has been configured to employ the license plate as the proximity sensor. Optionally, a license plate frame 88 is applied over the license plate. The described invention is adaptable for use with additional or alternative automotive features, such as by locating the proximity sensor 28 in association with features of the vehicle other than the license plate area 12. It should be appreciated that the opener can be modular and can be presented as a complete, functional package that can be aimed in any direction. Accordingly, the opener is not limited to placement at the rear of a car. Front or side placements are possible, at the user's selection.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. A hands-free closure control device configured, in use, for installation on a vehicle with a conductive license plate mounted at matching fastener locations between said vehicle and said license plate, the vehicle presenting a vehicle ground plane with respect to said hands-free closure control device, the vehicle having a back license plate reception area with outside and inside faces and located at a preselected location on the back of the vehicle, said back license plate reception area defining said matching fastener locations of the vehicle, said license plate defining said matching fastener locations of the conductive license plate, the vehicle having an automated closure and having a vehicle network operating said automated closure to open the closure in response to receiving an opening signal, said hands-free closure control device comprising:

a capacitive proximity sensor having opposite front and rear faces, in use mounted to the vehicle behind the license plate with front face outward and rear face toward the vehicle, and generating an electrical field;

an electrically driven shield positioned at said rear face of said capacitive proximity sensor, at a predetermined spacing from the rear face of the capacitive proximity sensor, in use when mounted on the vehicle between the vehicle and the capacitive proximity sensor, to electrically shield the rear face of the capacitive proximity sensor from the vehicle, to attenuate said electrical field at the rear face of the capacitive proximity sensor and to shape the electrical field to achieve directional detection at said front face of the capacitive proximity sensor and beyond the vehicle license plate by causing the electrical field to extend outward from the front face of the capacitive proximity sensor and beyond the vehicle license plate;

an electronic controller, in use communicating with the capacitive proximity sensor to monitor said electrical field for a suitable change, such as would occur by entry of a human triggering object into the monitored electrical field within a detectable range, and in response to detecting a suitable change, sending said opening signal to said vehicle network to cause said automated closure to open;

a dielectric carrier having front face and rear face, carrying the capacitive proximity sensor and said electrically driven shield;

a proximate ground plane for preventing false triggering of the automated closure due to excess space between the electrically driven shield and said vehicle ground plane, in use mounted between the vehicle and the electrically driven shield at a predetermined spacing to the electrically driven shield, sufficient to prevent false triggering due to excess spacing between the electrically, driven shield and the vehicle ground plane, and with electrical coupling to the vehicle sufficient to establish a common ground with the vehicle, whereby said proximate ground plane presents the vehicle ground potential to the rear side of the electrically driven shield at said preselected spacing between the vehicle and the electrically driven shield; and front fastening elements at said front face of said dielectric carrier, arranged in a matching pattern to the matching fastener locations of the license plate, in use mounting the license plate to the front face of the dielectric carrier with maintained dielectric isolation of the license plate from the vehicle ground plane.

2. The hands-free closure control device of claim 1, wherein:

in use when installed on said vehicle, said dielectric carrier extends behind said electrically driven shield by said predetermined spacing between the vehicle and the electrically driven shield, spacing the electrically driven shield from said proximate ground plane by the predetermined spacing sufficient to prevent false triggering.

3. The hands-free closure control device of claim 1, further comprising:

a vented screw, in use when installed on said vehicle, fastening said carrier to said license plate reception area and passing through the license plate reception area, providing a cable transmission passage from the outside face of the license plate reception area to the inside face of the license plate reception area;

wherein, in use, said electronic controller is mounted at the inside face of the license plate reception area; and a cable, in use passing through said vented screw and interconnecting said capacitive proximity sensor to the electronic controller.

4. The hands-free closure control device of claim 3, wherein;

said carrier defines rear mounting locations for mounting to said back license plate reception area, arranged in a matching pattern to said matching fastener locations of the vehicle;

at least a selected one of said defined rear mounting locations on the carrier is suited for receipt of said vented screw; and the carrier defines a routing passage between said capacitive proximity sensor and the selected, defined mounting location, in use receiving the vented screw, securing said cable in said routing passage from the capacitive proximity sensor to the vented screw.

5. The hands-free closure control device of claim 1, wherein said carrier comprises:

rear fastening elements electrically isolated from said front fastening elements;

wherein:

said rear fastening elements are arranged in a matching pattern to the matching fastener locations of said vehicle, in use mounting the carrier to the vehicle without establishing electrical connection between said license plate and the vehicle; and said conductive ground plane is configured, in use, to be mounted between the vehicle and said electrically driven shield on at least one of the rear fastening elements to establish said electrical coupling to the vehicle.

6. The hands-free closure control device of claim 1, wherein:

in use, said capacitive proximity sensor and said electrically driven shield are mounted at said outside face of said license plate reception area.

7. The hands-free closure control device of claim 1, wherein:

said predetermined spacing between said electrically driven shield and said capacitive proximity sensor comprises an air gap.

8. A hands-free closure control device configured for operation, in use, with a vehicle having conductive portions presenting vehicle electrical ground potential and having an automated closure operated by a vehicle network to open the closure, said vehicle defining a license plate reception area having outside and inside faces and carrying a license plate thereon, comprising:

a capacitive proximity sensor radiating an electrical field, having opposite front and rear faces, in use mounted on said vehicle at said outside face of said license plate reception area and behind said license plate, with said front face of said capacitive proximity sensor facing outward from the license plate reception area;

an electrically driven shield, in use mounted rearward of said capacitive proximity sensor, between the license plate reception area and the capacitive proximity sensor, at a preselected spacing from said rear face of the capacitive proximity sensor, to electrically shield the rear face of the capacitive proximity sensor from the vehicle, to attenuate said electrical field at the rear face of the capacitive proximity sensor, and to shape the electrical field to achieve directional detection at said front face of the capacitive proximity sensor and beyond the vehicle license plate by causing the electrical field to extend outward from the front face of the capacitive proximity sensor and beyond the vehicle license plate;

an electronic controller operating the capacitive proximity sensor to monitor said electrical field for a suitable change, such as would occur by entry of a human triggering object into the monitored electrical field within a detectable range, and in response to detecting a suitable change, sending a signal to said vehicle network to cause the vehicle's automated closure to open;

a dielectric carrier having the capacitive proximity sensor mounted thereon a vented screw, in use, mounting said dielectric carrier to the license plate reception area and passing through the license plate reception area, providing a cable transmission passage from said outside face of the license plate reception area to said inside face of the license plate reception area;

wherein:

in use, said electronic controller is mounted behind the license plate reception area; and further comprising:

a cable passing through the vented screw and interconnecting the capacitive proximity sensor to the electronic controller.

9. The hands-free closure control device of claim 8, further comprising:

an extension plate supplementing said shield, attached to said carrier at an edge of said capacitive proximity sensor, in use tuning the shape and sensitivity of said electrical field.

10. A hands-free closure control device in a motor vehicle having an automated closure and having a vehicle network connected to said automated closure to open the closure in response to receiving an opening signal from said closure control device, the motor vehicle defining a license plate reception area located at a rear end thereof and carrying a conductive license plate configured with fastener locations in a known location pattern, said license plate reception area defining license plate fastener locations in said known location pattern, wherein said hands-free closure control device is located behind said conductive license plate, and wherein said motor vehicle has a chassis electrical ground potential and provides said chassis electrical ground potential with respect to said hands-free closure control device, the hands-free closure control device comprising:

a capacitive proximity sensor having opposite front face and rear face, mounted to the vehicle behind the license plate with front face outward and rear face toward the vehicle, and generating an electrical field;

an electrically driven shield positioned at said rear face of said capacitive proximity sensor, mounted at a predetermined spacing from the rear face of the capacitive proximity sensor and between the vehicle and the capacitive proximity sensor, electrically shielding the rear face of the capacitive proximity sensor from the vehicle, attenuating said electrical field at the rear face of the capacitive proximity sensor and shaping the electrical field to achieve directional detection at said front face of the capacitive proximity sensor and beyond the conductive vehicle license plate by causing the electrical field to extend outward from the front face of the capacitive proximity sensor and beyond the conductive vehicle license plate;

an electronic controller communicating with the capacitive proximity sensor to monitor said electrical field for a suitable change, such as would occur by entry of a human triggering object into the monitored electrical field within a detectable range, and in response to detecting a suitable change, sending said opening signal to said vehicle network to cause said automated closure to open;

a dielectric carrier having front face and rear face, carrying the capacitive proximity sensor and said electrically driven shield;

a proximate ground plane preventing false triggering of the automated closure due to excess space between the electrically driven shield and said vehicle ground plane, mounted between the vehicle and the electrically driven shield at a predetermined spacing behind the electrically driven shield, sufficient to prevent false triggering due to excess spacing between the electrically driven shield and the vehicle ground plane, and with electrical coupling to the vehicle establishing a common ground with the vehicle, whereby said proximate ground plane presents the vehicle ground potential to the rear side of the electrically driven shield at said preselected spacing between the vehicle and the electrically driven shield; and front fastening elements at said front face of said dielectric carrier, arranged in the known location pattern of license plate fastener locations, mounting the license plate to the front face of the dielectric carrier with maintained dielectric isolation of the license plate from the vehicle ground plane.

11. The hands-free closure control device of claim 10, wherein:

said dielectric carrier extends behind said electrically driven shield by said predetermined spacing between said vehicle and the electrically driven shield, spacing the electrically driven shield from said proximate ground plane by the predetermined spacing sufficient to prevent false triggering.

12. The hands-free closure control device of claim 10, further comprising:

a vented screw fastening said carrier to said license plate reception area and passing through the license plate reception area, providing a cable transmission passage from said outside face of the license plate reception area to said inside face of the license plate reception area;

wherein, said electronic controller is mounted at the inside face of the license plate reception area; and a cable passes through said vented screw and interconnects said capacitive proximity sensor to the electronic controller.

13. The hands-free closure control device of claim 12, further comprising;

rear fastening elements at said rear face of said dielectric carrier arranged at fastener locations in said known location pattern of license plate fastener locations, mounting the dielectric carrier to the license plate reception area at said fastener locations of the license plate reception area arranged in said known location pattern;

a said rear fastening element on the carrier at a selected fastener location comprises said vented screw; and the carrier defines a routing passage between said capacitive proximity sensor and said selected fastener location containing the vented screw, securing said cable in said routing passage from the capacitive proximity sensor to the vented screw.

14. The hands-free closure control device of claim 10, wherein said carrier further comprises:

rear fastening elements electrically isolated from said front fastening elements;

wherein:

said rear fastening elements are arranged at fastener locations in said known location pattern of license plate fastener locations, mounting the dielectric carrier to the license plate reception area at said fastener locations of the license plate reception area arranged in said known location pattern, mounting the carrier to the vehicle without establishing electrical connection between said license plate and the vehicle; and said conductive ground plane is mounted between said license plate reception area and said electrically driven shield on at least one of the rear fastening elements, thereby establishing said electrical coupling to the vehicle.

15. The hands-free closure control device of claim 10, wherein:

said capacitive proximity sensor and said electrically driven shield are mounted at said outside face of said license plate reception area.

* * * * *